(12) United States Patent
Sugano et al.

(10) Patent No.: US 9,973,553 B2
(45) Date of Patent: May 15, 2018

(54) MEETING SUPPORT APPARATUS, METHOD FOR EXECUTING MEETING SUPPORT PROCESS, AND NON-TRANSITORY COMPUTER-READABLE RECORDING MEDIUM

(71) Applicant: FUJITSU LIMITED, Kawasaki-shi, Kanagawa (JP)

(72) Inventors: Hiroyasu Sugano, Koto (JP); Zhaogong Guo, Koto (JP); Tatsuro Matsumoto, Yokohama (JP); Akira Fujii, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 120 days.

(21) Appl. No.: 15/216,391

(22) Filed: Jul. 21, 2016

(65) Prior Publication Data

US 2017/0026429 A1    Jan. 26, 2017

(30) Foreign Application Priority Data

Jul. 24, 2015 (JP) .................................. 2015-147039

(51) Int. Cl.
*H04L 29/06* (2006.01)
*H04L 12/18* (2006.01)

(52) U.S. Cl.
CPC ...... *H04L 65/4038* (2013.01); *H04L 12/1827* (2013.01)

(58) Field of Classification Search
CPC ............. H04L 65/4038; H04L 12/1827; H04L 65/601; H04L 65/4015; H04W 8/24; H04W 4/14; H04W 4/16

USPC ......................................................... 709/204
See application file for complete search history.

(56) References Cited

U.S. PATENT DOCUMENTS

| | | | |
|---|---|---|---|
| 2004/0230651 | A1 | 11/2004 | Ivashin |
| 2015/0019694 | A1* | 1/2015 | Feng ..................... H04L 65/601 709/219 |
| 2016/0301729 | A1* | 10/2016 | Gurevich .............. H04L 65/602 |

FOREIGN PATENT DOCUMENTS

| | | |
|---|---|---|
| JP | 2004-343761 | 12/2004 |
| JP | 2007-133495 | 5/2007 |
| JP | 2009-232054 | 10/2009 |

(Continued)

*Primary Examiner* — Tu Nguyen
(74) *Attorney, Agent, or Firm* — Fujitsu Patent Center

(57) ABSTRACT

A method includes reporting area information identifying a predetermined area to the predetermined area, transmitting an application when terminal identification information identifying a terminal is received from the terminal that received the area information, receiving first tag information transmitted in response to an operation performed by the application, retaining the received first tag information, managing second tag information shared in a meeting held by the terminal and another terminal, determining a target share information to be newly shared according to the first tag information and the second tag information, transmitting a proposal proposing that the target share information be shared to the terminal retaining the target share information, and updating the second tag information based on tag information including a tag and importance information of the target share information newly shared in a case of receiving a response from the application indicating that the terminal accepts the proposal.

18 Claims, 15 Drawing Sheets

(56) References Cited

FOREIGN PATENT DOCUMENTS

| JP | 2013-012059 | 1/2013 |
|----|-------------|--------|
| JP | 2013-029993 | 2/2013 |

\* cited by examiner

FIG.5

| | PHASE | | |
|---|---|---|---|
| | SIMPLE SHARING | DIVERGENCE | CONVERGENCE |
| BRIEF OVERVIEW | CONFERENCE FOR SHARING INFORMATION (E.G., WORK PROGRESS) BETWEEN PARTICIPANTS | CONFERENCE FOR PRESENTING OPINIONS AND CREATING IDEAS | CONFERENCE FOR CONCLUDING PRESENTED IDEAS |
| OBJECTIVE OF INFORMATION SHARING | ELIMINATE DIFFERENCE OF INFORMATION BETWEEN USERS | PRESENT OPINIONS FROM DIFFERENT STANDPOINTS WHEN PROMOTING NEW IDEAS | NOT PRESENTING NEW IDEAS BUT SORTING IDEAS ALREADY PRESENTED |

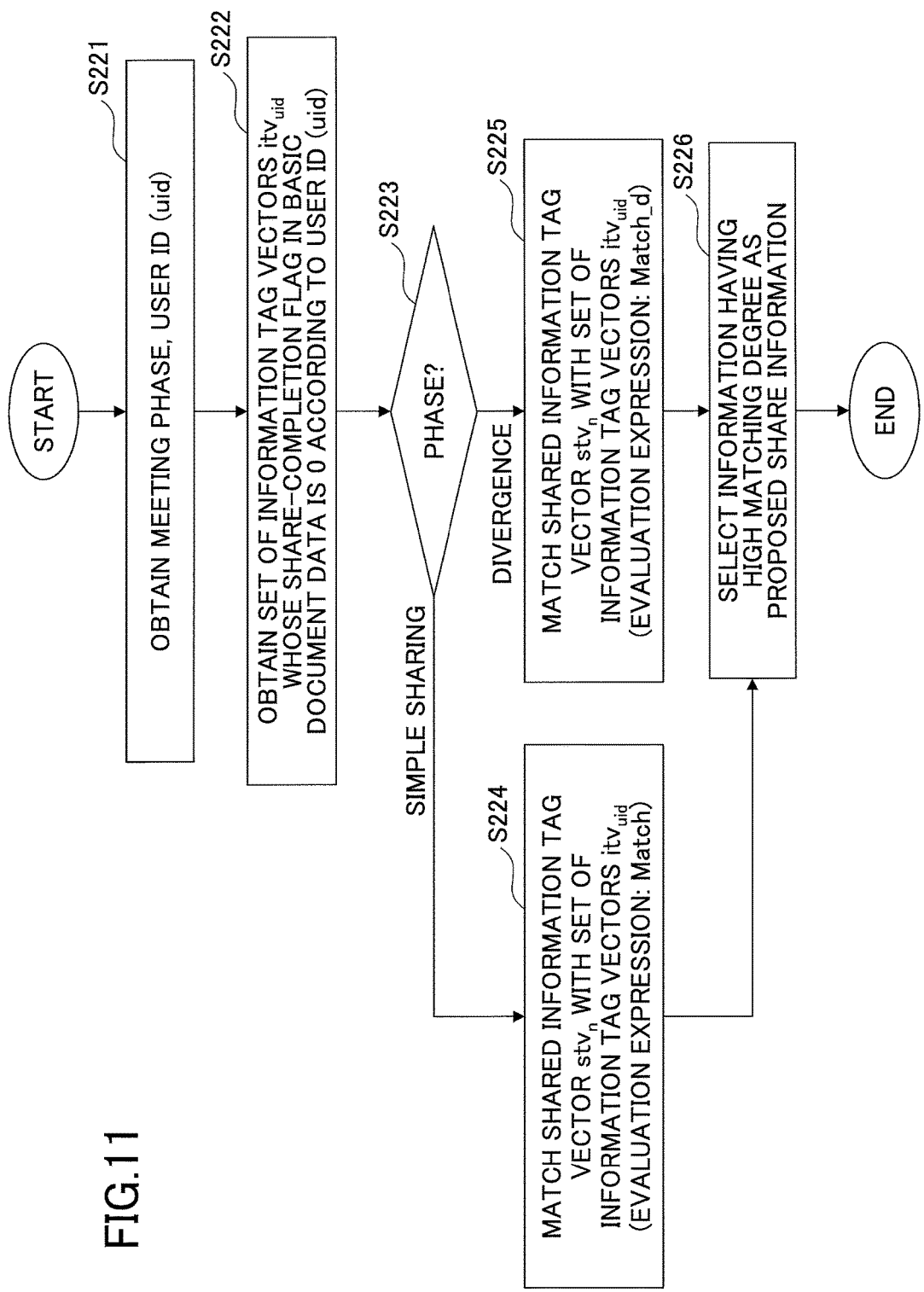

FIG.12

SHARED INFORMATION TAG VECTOR stv = { (tag$_1$, w$_1$), (tag$_2$, w$_2$), ⋯ , (tag$_p$, w$_p$) }

INFORMATION TAG VECTOR itv = { (tag$_1$, u$_1$), (tag$_2$, u$_2$), ⋯ , (tag$_q$, u$_q$) } common(stv, itv): SET OF TAGS COMMONLY INCLUDED IN stv AND itv

MATCHING EVALUATION EXPRESSION $$\text{Match}(stv, itv) = \sum_{t \in \text{common}(stv, itv)} \{ w_i \times u_k \mid (t, w_i) \in stv, (t, u_k) \in itv \}$$

$$\text{Match\_d}(stv, itv) = \sum_{t \in \text{common}(stv, itv)} \{ w_i \times u_k \mid (t, w_i) \in stv, (t, u_k) \in itv \}$$
$$+ \sum \{ u_k \mid (t, u_k) \in itv, t \notin \text{common}(stv, itv) \}$$

MEETING SUPPORT APPARATUS, METHOD FOR EXECUTING MEETING SUPPORT PROCESS, AND NON-TRANSITORY COMPUTER-READABLE RECORDING MEDIUM

CROSS-REFERENCE TO RELATED APPLICATIONS

This application is based upon and claims the benefit of priority of the prior Japanese Patent Application No. 2015-147039 filed on Jul. 24, 2015, the entire contents of which are incorporated herein by reference.

FIELD

The embodiments discussed herein are related to a meeting support apparatus, a method for executing a meeting support process, and a non-transitory computer-readable recording medium.

BACKGROUND

Owing to the wide use of terminal devices such as smartphones and tablets, a meeting (e.g., conference, preliminary arrangement, seminar) can be easily held in which participants of the meeting bring along their terminal devices. In a conventional meeting, preparation of paper reference material and the handing out of the paper reference material are required. However, recent meetings allow participants to instantaneously share gathered information stored in each of the participants' terminal devices. Thereby, the quality of the meetings can be increased.

FIG. 1 is a schematic diagram illustrating an example of the sharing of information in a meeting with the use of terminal devices. In the example, a participant A brings to the meeting a tablet that is sharing information with a personal computer (PC) used at the participant A's desk. Further, a participant B brings to the meeting a smartphone that is sharing information with a PC or a tablet that is used for the purpose of work at the participant B's desk or for the purpose of the participant B's hobby. Further, a participant C may bring a smartphone to the meeting. Then, the participant A, the participant B, and the participant C share their information with other members of the meeting according to the content of the meeting and proceed with the meeting. The sharing of information is performed by displaying the shared information on a participant's terminal device or by displaying the shared information on a large screen.

SUMMARY

According to an aspect of the invention, there is provided a method for causing a computer to execute a meeting support process. The method includes reporting area information identifying a predetermined area to the predetermined area, transmitting an application program when terminal identification information identifying a terminal device is received from the terminal device that received the area information, receiving first tag information transmitted in response to an operation performed by the application program, the first tag information containing a first tag and importance information of the first tag, the first tag being included in information that the terminal device allows to be shared, retaining the received first tag information, managing second tag information shared in a meeting that is held by the terminal device and another terminal device, the second tag information containing a second tag and importance information of the second tag, the second tag being included in information that is already shared by the terminal device and the other terminal device, determining a target share information to be newly shared according to the first tag information and the second tag information, transmitting a proposal proposing that the target share information be shared to the terminal device retaining the target share information, and updating the second tag information based on tag information including a tag and importance information of the target share information that is newly shared in a case of receiving a response from the application program indicating that the terminal device accepts the proposal.

The object and advantages of the invention will be realized and attained by means of the elements and combinations particularly pointed out in the claims.

It is to be understood that both the foregoing general description and the followed detailed description are exemplary and explanatory and are not restrictive of the invention, as claimed.

BRIEF DESCRIPTION OF DRAWINGS

FIG. 5 is a schematic diagram depicting an overview of each phase and an information sharing objective of each phase according to an embodiment of the present invention;

FIG. 11 is a flowchart illustrating an operation of evaluating the sharing of a document according to an embodiment of the present invention;

FIG. 12 is a schematic diagram illustrating a matching evaluation expression according to an embodiment of the present invention;

DESCRIPTION OF EMBODIMENTS

In a paperless conference or the like, there is a technology of sharing information with other users by attaching a user's memo to conference material (See, for example, Japanese Laid-Open Patent Publication No. 2013-12059).

Although sharing each of the user's information by using a terminal device is useful, the information shared by the users may not necessarily be appropriate for the situation of the meeting because the choice of information to be shared relies on each user's judgement. Further, it may be burdensome for a user to select information that is appropriate for the situation of the meeting from the information gathered by the users participating in the meeting.

Next, embodiments of the present invention are described with reference to the accompanying drawings.

<Configuration>

Figure 1:
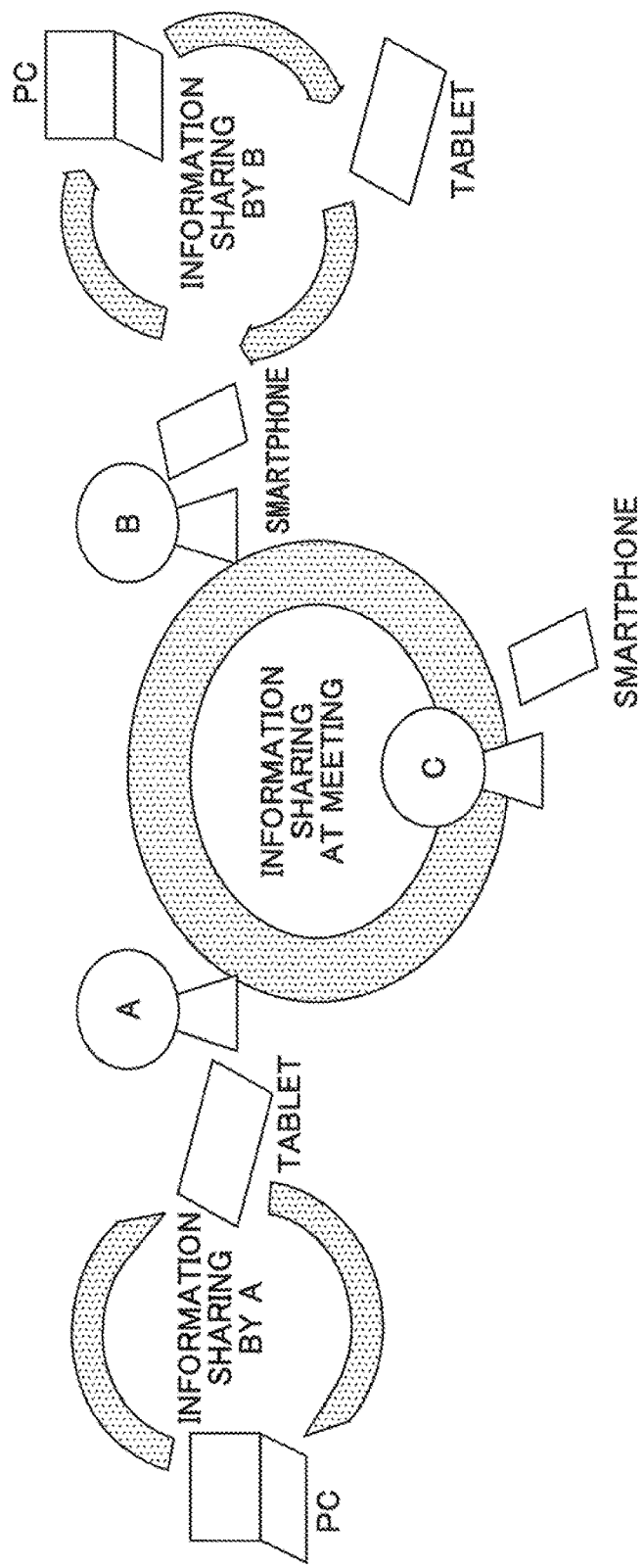
FIG. 1 is a schematic diagram illustrating an example of sharing of information in a meeting with use of a terminal device.
Figure 2:
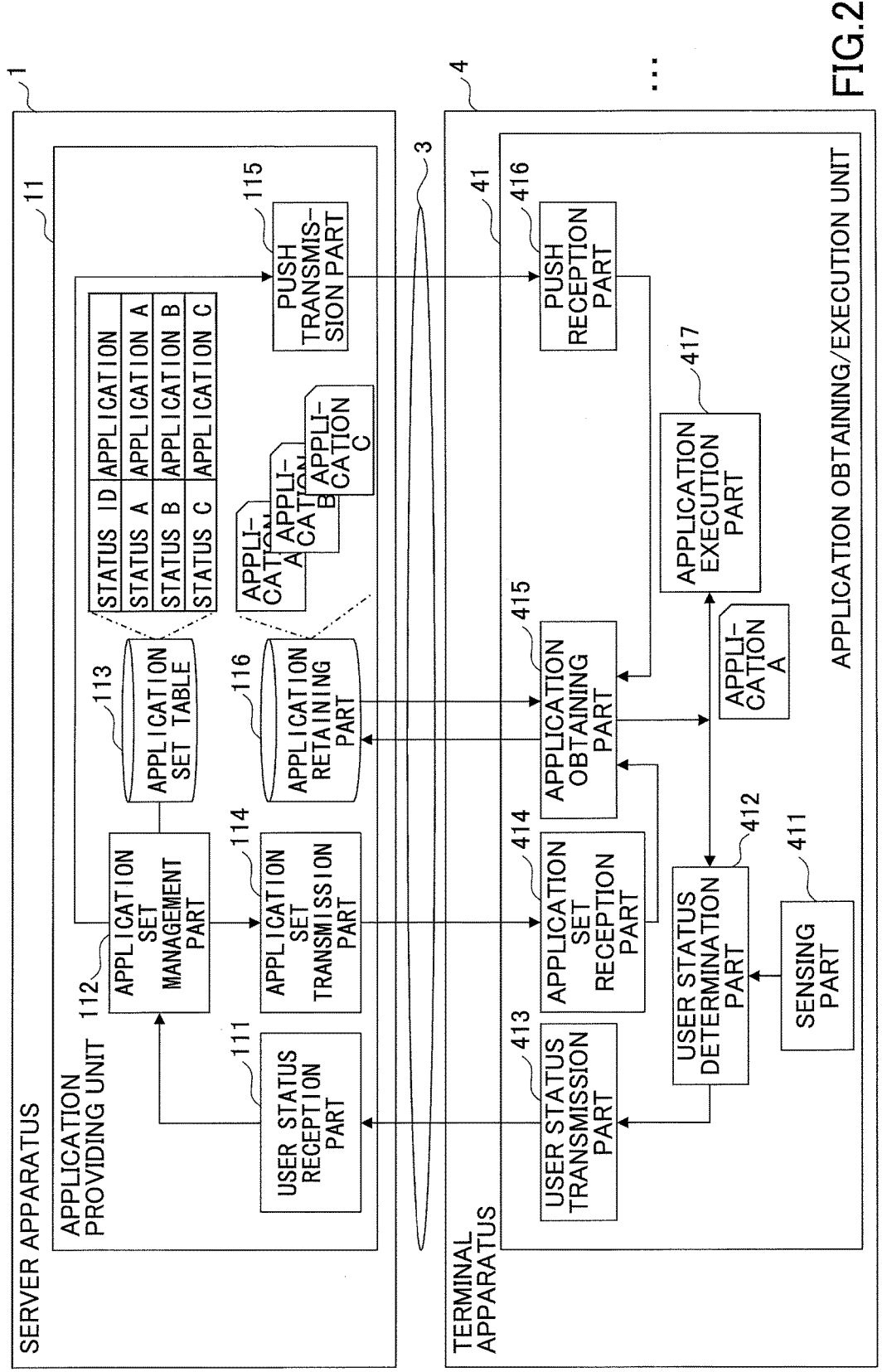
FIG. 2 is a schematic diagram illustrating a configuration of a system for providing an application according to an embodiment of the present invention.

FIG. 2 is a schematic diagram illustrating a configuration of a system for providing an application according to an embodiment of the present invention. In FIG. 2, a server apparatus 1 communicates with multiple terminal devices 4 by mainly using wireless communication via a network 3. The terminal device 4 may be, for example, a smartphone or a tablet carried by the user participating in a meeting or the like.

The server apparatus 1 includes an application providing unit 11. The application providing unit 11 includes a user status reception part 111, an application set management part 112, an application set table 113, an application set transmission part 114, a push-transmission part 115, and an application retaining part 116. The user status reception unit 111 functions to receive user status data (e.g., data pertaining to whether a predetermined application (application program) is retained in the terminal device 4 of a user when the terminal device enters a predetermined area) and notify the status of the user (user status) to the application set management part 112. In a case where the application set management part 112 receives a notice of the user status from the user status reception part 111, the application set management part 112 functions to obtain an application set (information for identifying an application program) associated with the user status in the application set table 113 and notify the application set to the application set transmission part 114. Further, the application set management part 112 notifies to the Push transmission part 115 that the application set is to be transmitted. When the Push transmission part 115 receives the notice of the transmission from the application set management part 115, the Push transmission part 115 notifies the terminal device 4 that the obtaining (downloading) of an application is possible by way of a Push notice. The application retaining part 116 retains an application body corresponding to the application set.

The terminal device 4 includes an application obtaining/execution unit 41. The application obtaining/execution unit 41 includes a sensing part 411, a user status determining part 412, a user status transmission part 413, an application set reception part 414, an application obtaining part 415, a Push reception part 416, and an application execution part 417. The sensing part 411 functions to detect the terminal device 4 entering a predetermined area. For example, the sensing part 411 may function to detect area information reported by a wireless LAN (Local Area Network) or read data from a wireless tag. In a case where the sensing part 411 detects the terminal device 4, the user status determination part 412 determines the user status serving as significant information required by an application. Then, the user status determination part 412 notifies the result of the determination to the user status transmission part 413. The user status transmission part 413 functions to transmit the user status notified from the user status determination part 412 to the server apparatus 1. The application set reception part 414 functions to receive the application set from the server apparatus 1 and notify the application set to the application obtaining part 415. The Push reception part 416 functions to receive the Push notice from the server apparatus 1. The application obtaining part 415 functions to obtain an application (application body) corresponding to the application set notified by the application set reception part 414 from the server apparatus 1. The application execution part 417 functions to execute the application obtained by the application obtaining part 415.

Figure 3:
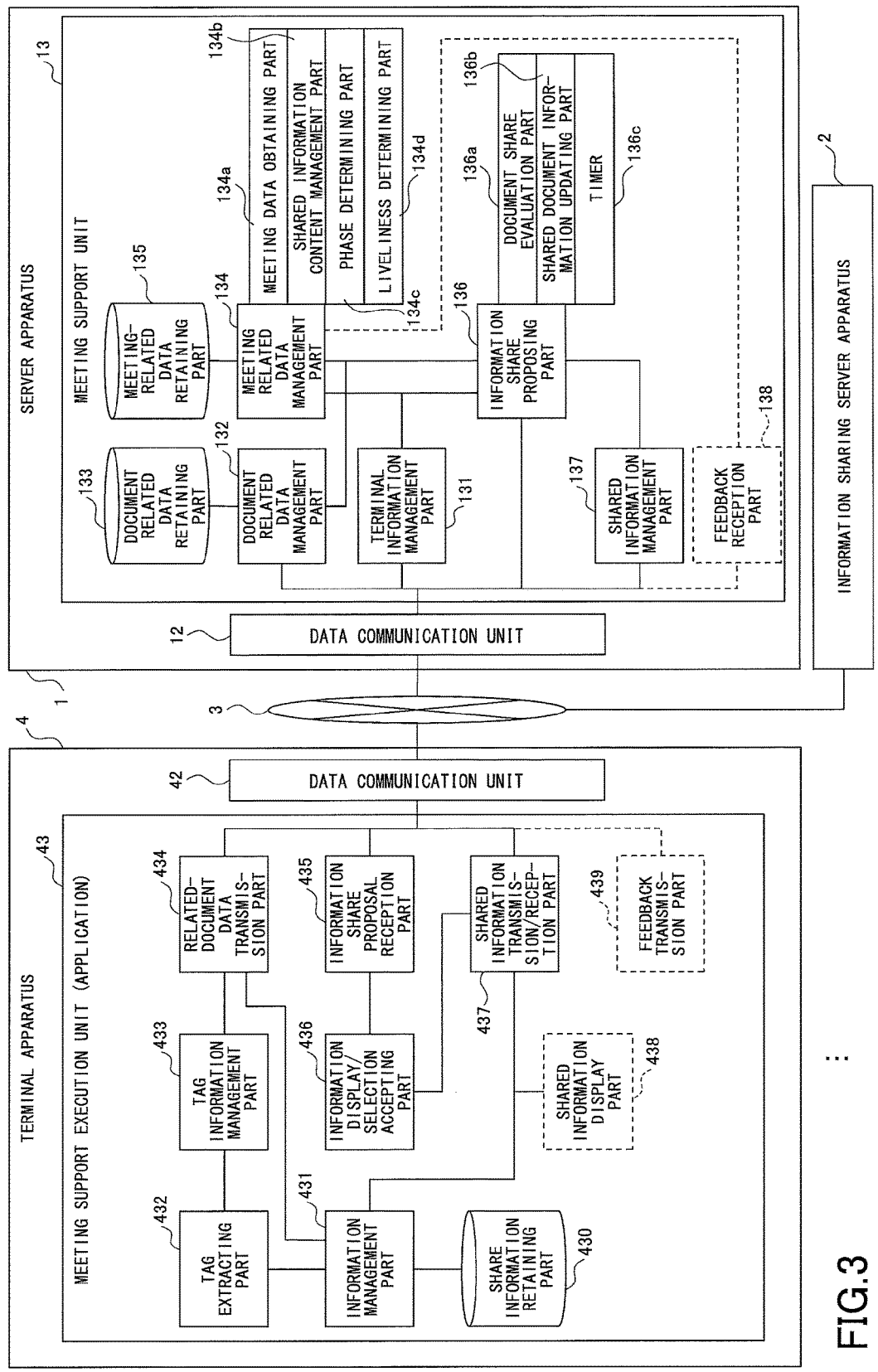
FIG. 3 is a schematic diagram illustrating an example of a configuration for executing a meeting support process according to an embodiment of the present invention.

FIG. 3 is a schematic diagram illustrating an example of a configuration for executing a meeting support process. In the example illustrated in FIG. 3, the server apparatus 1 can perform wireless or cable communication with the terminal device 4 or the information sharing server apparatus 2 via the network 3. The information sharing server apparatus 2 functions to enable information to be shared by each of the terminal devices 4 carried by multiple users. For example, the information sharing server 2 displays information to be shared (shared data) on the terminal devices 4 of the users (members) participating in a meeting. Further, the information sharing server apparatus 2 may display the shared data on a large screen that is set in a meeting room. In this embodiment, the server apparatus 1 is described to have both an application providing function (see FIG. 2) and a meeting support function. However, the application providing function and the meeting supporting function may be separately provided by different server apparatuses.

The server apparatus 1 includes a data communication unit 12 and a meeting support unit 13. The data communication unit 12 functions to perform wireless or cable communication with the terminal device 4 or the information sharing server apparatus 2 via the network 3.

The meeting support unit 13 includes a terminal information management part 131, a document-related data management part 132, a document-related data retaining part 133, a meeting-related data management part 134, and a meeting-related data retaining part 135. Further, the meeting support unit 13 includes an information share proposing part 136, a shared information management part 137, and a feedback reception part 138.

The terminal information management part 131 functions to manage terminal information (e.g., terminal address, user ID) pertaining to the terminal device 4 connected to the server apparatus 1. The document-related data management part 132 functions to store the document-related data obtained from each terminal device 4 in the document-related data retaining part 133 and manage the stored document-related data. The document-related data is described in further detail below.

The meeting-related data management part 134 functions to store meeting-related data (i.e., data pertaining to meeting held by users of multiple terminal devices 4) in the meeting-related data retaining part 135 and manage the stored meeting-related data. The meeting-related data is described in further detail below. The meeting-related data management part 134 uses a meeting data obtaining part 134a, a shared information content management part 134b, a phase determining part 134c, and a liveliness determining part 134d when executing the above-described functions (processes). The meeting data obtaining part 134a obtains data by, for example, receiving input of basic information of a meeting from a representative (administrator) of the users participating in the meeting or acquiring the administrator's permission to obtain data from the past history of all or a part of the users participating in the meeting. The shared information content management part 134b functions to manage the basic information of the meeting and tag information (e.g., a tag (keyword) included in the information already shared in the meeting or the weight of the tag).

The phase determining part 134c functions to decide (determine) the phase of a meeting. The phase may be classified depending on propensities such as "whether information sharing is desired in the meeting" or "the degree (high or low) in which information sharing is desired". The liveliness determining part 134d functions to determine the liveliness of a meeting (e.g., whether the meeting is lively expedited). Note that "liveliness" is basically determined on how many times document sharing is performed within a predetermined interval in the past. For example, the liveliness of the meeting is determined to be "stagnant" when document sharing is only performed less than a predetermined number of times. Otherwise, the liveliness of the meeting is determined to be "lively". The "liveliness" of a meeting may also be determined by using a criterion such as sensing data indicating the activity of the participants of the meeting. For example, the "liveliness" of a meeting may be determined based on audio indicating how lively discussions are made.

The information share proposing part 136 functions to propose information recommended to be shared (information share proposal) to the user's terminal device 4 that is retaining the information. The information share proposing part 136 may propose the information recommended to be shared according to the current status of the meeting by referring to meeting-related data and document-related data. The information share proposing part 136 uses a document share evaluating part 136a and a shared document information updating part 136b when making the information sharing proposal. The document share evaluating part 136a functions to evaluate a document to be shared by a matching process using a predetermined evaluation expression. For example, the matching process may be performed between the tag information included in the meeting-related data and the tag information included in the document-related data of each document. The shared document information updating part 136b functions to update the tag information of the meeting-related data when information is newly shared by the users. The timer 136c functions to trigger a process of newly proposing information to be shared in a case where a predetermined time elapses without any new data provided by a user that has shared information or in a case where a predetermined time elapses without any sharing of information in an entire meeting.

The information share management part 137 functions to manage the sharing of information by the information sharing server apparatus 2. The feedback reception part 138 functions to receive feedback pertaining to the shared information from the terminal device 4 and report the feedback to the meeting-related data management part 134. For example, the feedback may indicate the pressing of a "like" button regarding certain shared information. The meeting-related data management part 134 may increase/reduce the weight of a tag of corresponding information in response to the feedback from the feedback reception part 138. As expanded functions of the feedback reception part 138 and the meeting-related data management part 138, the content of a user's conversation (synchronously or asynchronously used with chatting by text) may be included in the feedback and an important word may be extracted from the feedback by way of word-spotting technology or the like, so that the extracted word can be weighted according to the frequency of appearances of the word and managed as tag information by the meeting-related data management part 134.

On the other hand, the terminal device 4 includes a data communication unit 42 and a meeting support execution unit 43. The data communication unit 42 functions to perform wireless communication with the server apparatus 1 or the information share server apparatus 2 byway of the network 3. The meeting support execution unit 43 is implemented by an application obtained from the server apparatus 1.

The meeting support execution unit 43 includes a share information retaining part 430, an information management part 431, a tag extracting part 432, a tag information management part 433, and a related-document data transmission part 434. Further, the meeting support execution unit 43 includes an information share proposal reception part 435, an information display/selection accepting part 436, a shared information transmission/reception part 437, a shared information display part 438, and a feedback transmission part 439.

More specifically, the information management part 431 assigns a predetermined folder to the share information retaining part 430, stores the information which can be shared in the folder, and the share information retaining part 43 manages the share information stored in the folder. Although the share information retaining part 430 and the information management part 431 are internal parts of the meeting support implementing part 43 that are implemented by an application downloaded from the server apparatus 1 in the above-described embodiment, another separate application may be used to separately manage the information allowed to be shared.

The information management part 431 also manages basic information such as information pertaining to the creator of the information retained in the share information retaining part 430 or information pertaining to the time and date in which the information retained in the share information retaining part 430 is created. The tag extracting part 432 functions to extract a tag of each document from the information managed by the information management part 431. The tag may be accompanying information (e.g., title or date of the share information) of a document or a keyword included in the main text of a document. Further, the tag extracting part 432 functions to create (generate) an information tag together with importance information in accordance with the location in which the tag appears in the document (appearance location) or the frequency in which the tag appears in the document. A typically used algorithm for extracting a characteristic word of a document. For example, an tf-idf method may be used. The information tag management part 433 functions to manage the generating of information tags by the tag extracting part 432 and manage the information tags generated by the tag extracting part 432. The document-related data transmission part 434 functions to transmit document-related data to the server apparatus 1. The document-related data includes the information tags of each document managed by the information tag management part 433 and the basic information of the documents managed by the information management part 431.

The information share proposal reception part 435 functions to receive an information share proposal sent from the server apparatus 1 to the terminal device 4. The information share proposal includes information that identifies a document to be shared. The information display/selection accepting part 436 displays one or more documents proposed by the information share proposal from the server apparatus 1 to the user of the terminal device 4. Further, the information display/selection accepting part 436 accepts the selection of the document(s) to be shared. When the selection is made by the user, the share information transmission/reception part 437 functions to transmit a report to the server apparatus 1 for reporting that the information regarding a document to be shared has been selected by the user. The share information display part 438 functions to display the information to be shared to the user in accordance with the management by the information share server apparatus 2. In a case where information sharing by the information sharing server apparatus 2 is implemented by another application, the processes of the share information display part 438 may be omitted. The feedback transmission part 439 functions to transmit feedback pertaining to the shared information of the user's terminal device 4. The feedback may include, for example, the pressing of a "like" button regarding a certain shared information. Because the feedback transmission unit 439 is an additional function, the feedback transmission unit 439 may be omitted. In this case, the feedback reception part 138 on the side of the server apparatus 1 may also be omitted. The feedback may be expanded to include the content of a conversation by the user.

Figure 4:
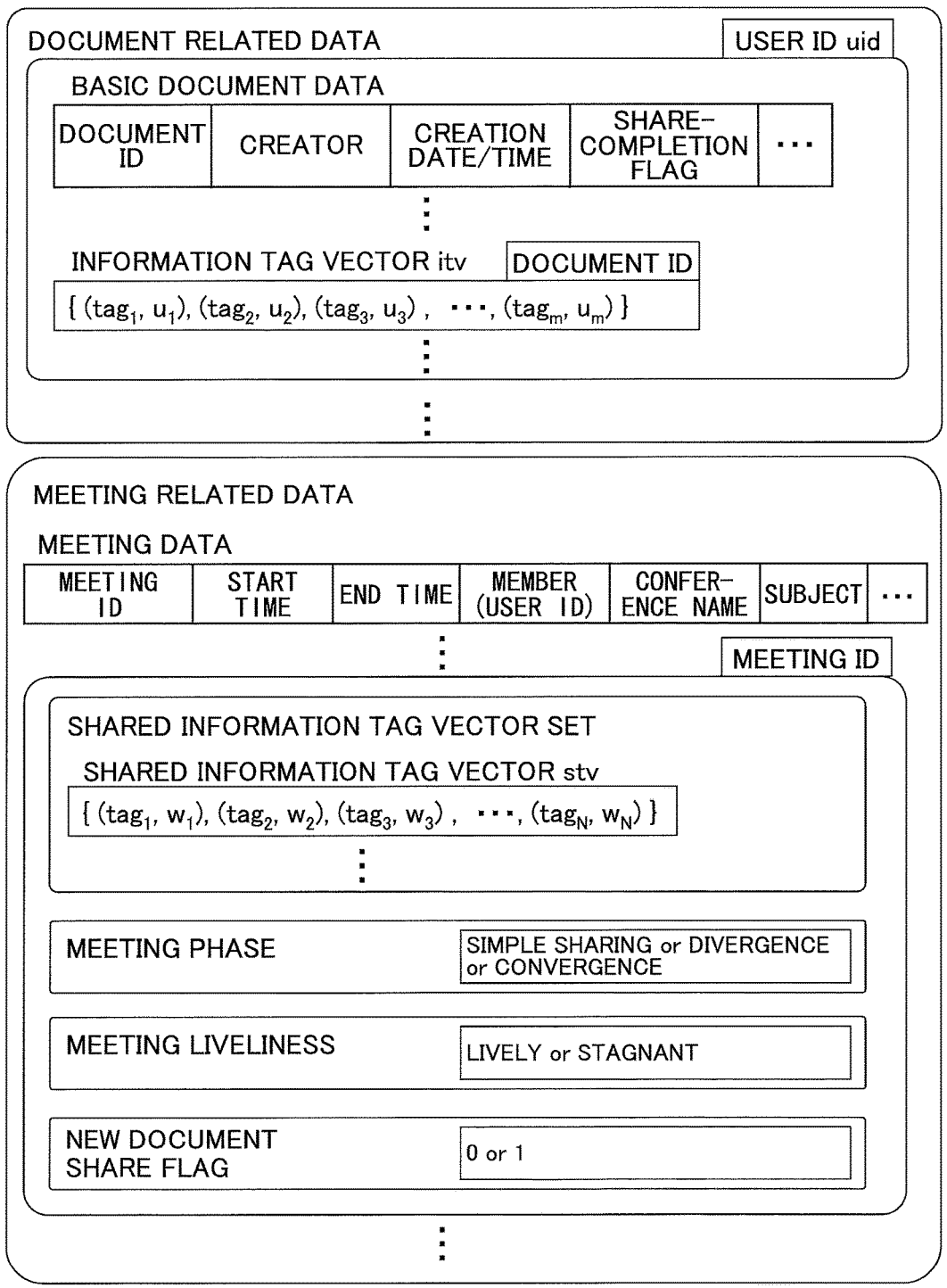
FIG. 4 is a schematic diagram illustrating data structures of document-related data and meeting-related data according to an embodiment of the present invention.

FIG. 4 is a schematic diagram illustrating data structures of document-related data retained in the document-related data retaining part 133 and the meeting-related data retained in the meeting-related data retaining part 135 of the server apparatus 1 according to an embodiment of the present invention. In FIG. 4, the document-related data includes basic document data of each document allowed to be shared in association with the user ID (uid) of the user of the terminal device 4. The document-related data also includes information tag vectors itv of each document. The basic document data includes, for example, a document ID, a creator, a creation date, and a share-completion flag. The share-completion flag indicates whether a document is already shared in the current meeting. For example, an initial value "0" indicates that the document is not yet shared. The information tag vector itv includes a pair of a tag extracted from a document (e.g., $tag_1$) and an importance (e.g., $u_1$) of the tag. Although the number of tags "m" of a document differs depending on the document, the upper limit of the number of tags "m" may be defined beforehand.

The meeting-related data includes meeting data that retains basic information of a meeting. For example, the meeting data may include "meeting ID", "meeting start time", "meeting end time (not set in some cases)", "members (list of user IDs)", "conference name", and "topic". The meeting-related data further includes information associated with the meeting ID such as "shared information tag vector set", "meeting phase (also simply referred to as "phase")", "meeting liveliness (also simply referred to as "liveliness")", and a "new document share flag".

The shared information tag vector set includes shared information tag vectors sty of each timing starting from the beginning of a meeting (initial state) to the current timing (updated timing). For example, assuming that "$stv_0$" indicates the initial state of a meeting, the current shared information tag vector is "$stv_n$" in a case the shared information is updated "n" times. In order to save storage space, the meeting-related data retaining part 135 may retain only the latest shared information. The shared information tag vector stv includes a pair of a tag extracted from a document (e.g., $tag_1$) and the weight (e.g., $w_1$) of the tag. As the shared information tag vector $stv_0$ of the initial state, a weight of "1.0" (initial value) is assigned to a tag that is extracted as an important word from the meeting data according to, for example, the conference name or the topic. In a case where a similar tag is found by searching the past meeting history of the same member or similar member, the similar tag may be set as the important word after obtaining confirmation by an administrator user. In a case where a tag cannot be extracted, the shared information tag vector $stv_0$ is blank. The shared information tag vector is updated when new information is shared. A vector average obtained from the immediate (most recent) shared information tag vector and the information tag vector itv of the newly shared information becomes the updated shared information tag vector.

As described above, the meeting phase is classified depending on propensities such as "whether information sharing is desired in the meeting" or "the degree (high or low) in which information sharing is desired". For example, the meeting phase may be classified to "simple sharing", "divergence", and "convergence". The default phase is "simple sharing". FIG. 5 is a schematic diagram depicting the overview of each phase and the information sharing objective of each phase. That is, the "simple sharing" phase corresponds to a conference in which information such as work progress is shared by participants of a conference. The objective of sharing information in the "simple sharing" phase is to eliminate any difference of information being shared among the users. The "divergence" phase corresponds to a conference in which participants of a conference present opinions and create new ideas. The objective of sharing information in the "divergence" phase is to promote new ideas and in some cases present opinions from different standpoints. The "convergence" phase corresponds to a conference in which participants conclude (settle) the ideas that have been presented. The objective of sharing information in the "convergence" phase is not to present new ideas but to sort (organize) the ideas already presented.

Figure 6:
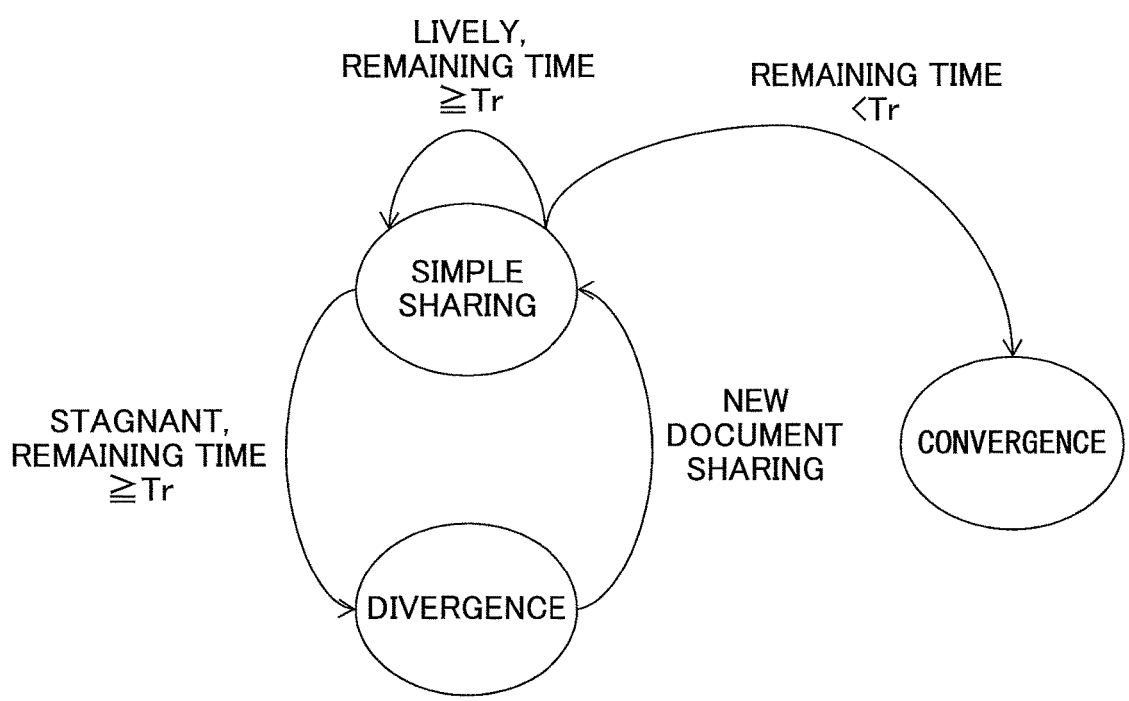
FIG. 6 is a schematic diagram illustrating a status transition of a meeting phase according to an embodiment of the present invention.

FIG. 6 is a schematic diagram illustrating the status transition of a meeting phase according to an embodiment of the present invention. The status of a meeting phase is determined by referring to, for example, the remaining time of the meeting and the liveliness of the meeting. In a case where the status of a meeting is a "simple sharing" phase, the status is maintained as the "simple sharing" phase if the liveliness of the meeting is "lively" and the remaining time is equal to or greater than a predetermined time Tr (excluding a case where the remaining time is null). Further, in the case where the status of the meeting is the "simple sharing" phase, the phase of the meeting shifts to the "convergence" phase if the remaining time is less than the predetermined time Tr. Further, in the case where the status of the meeting is the "simple sharing" phase, the phase of the meeting shifts to the "divergence" phase if the liveliness of the meeting is "stagnant" and the remaining time is equal to or greater than the predetermined time Tr. Further, in a case where the status of the meeting is the "divergence" phase, the phase of the meeting shifts to the "simple sharing" phase if a document is newly shared.

Returning to FIG. 4, the "liveliness" of a meeting indicates, for example, whether the meeting is lively and includes a "lively" state and a "stagnant" state as described above.

The new document share flag indicates whether information is newly shared. In a case where information is newly shared, the value of the new document share flag becomes "1". When information is newly shared in a case where the phase of the meeting is the "divergence" state, the value of the new document flag is reset to "0" when the phase of the meeting shifts from the "divergence" state to the "simple sharing" state.

Figure 7:
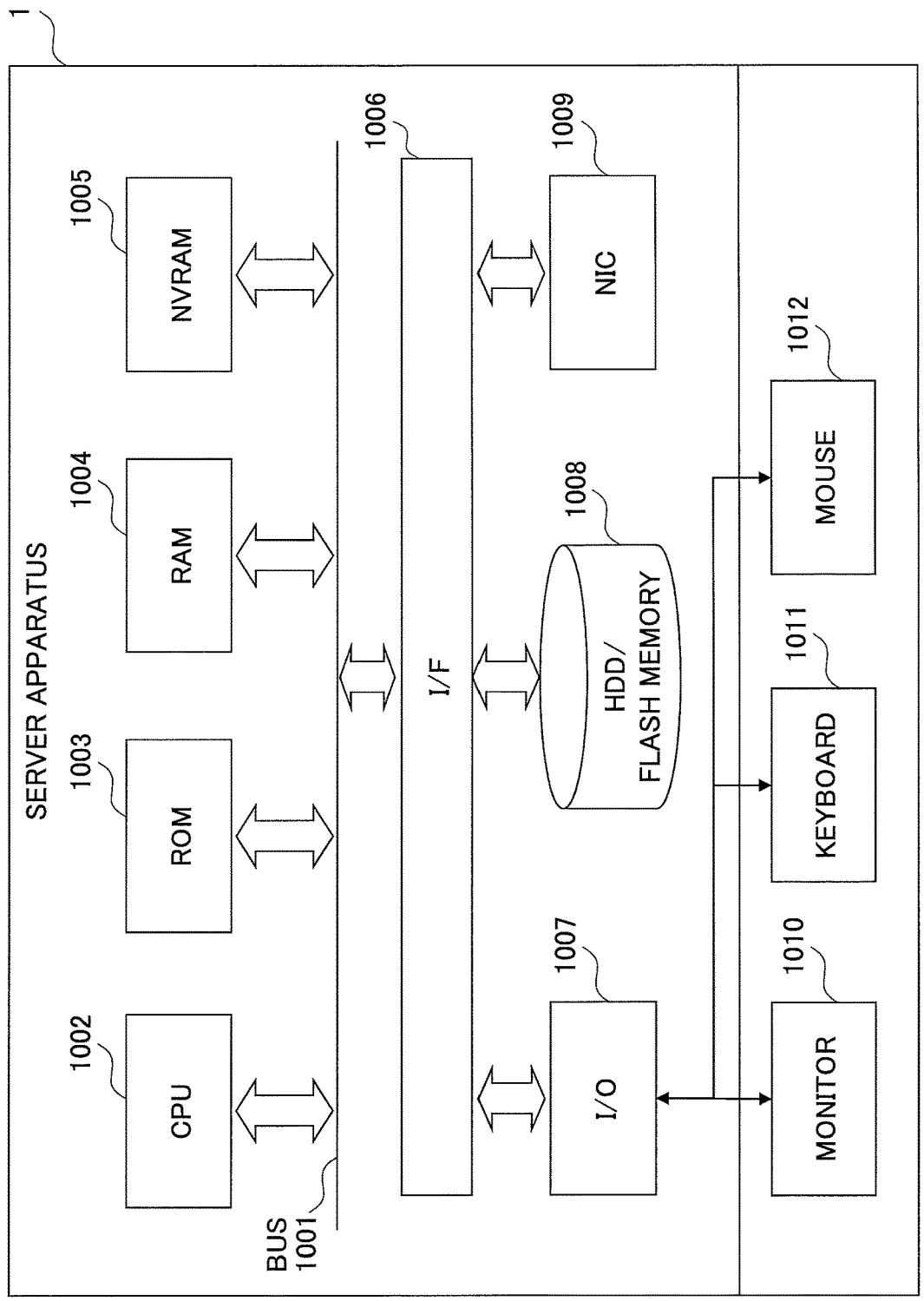
FIG. 7 is a schematic diagram illustrating a hardware configuration of a server apparatus according to an embodiment of the present invention.

FIG. 7 is a schematic diagram illustrating a hardware configuration of the server apparatus 1 according to an embodiment of the present invention. In FIG. 7, the server apparatus 1 includes a CPU (Central Processing Unit) 1002, a ROM (Read Only Memory) 1003, a RAM (Random Access Memory) 1004, a NVRAM (Non-Volatile Random Access Memory) 1005 that are connected to a system bus 1001. Further, the server apparatus 1 also includes an I/O (Input/Output) device 1007, an HDD (Hard Disk Device)/flash memory 1008, an NIC (Network Internet Card) 1009 that are connected to an I/F (interface) 1006. Further, the server apparatus 1 also includes a monitor 1010, a keyboard 1011, and a mouse 1012. A CD (Compact Disk) or a DVD (Digital Versatile Disk) drive may also be connected to the I/O 1007.

The functions of the server apparatus 1 described above with reference to FIGS. 2 and 3 are implemented by a predetermined program executed by the CPU 1002. The program may be obtained by way of a non-transitory recording medium on which the program is recorded. Alternatively, the program may be obtained from a network. Alternatively, the program may be assembled to a ROM.

Figure 8:
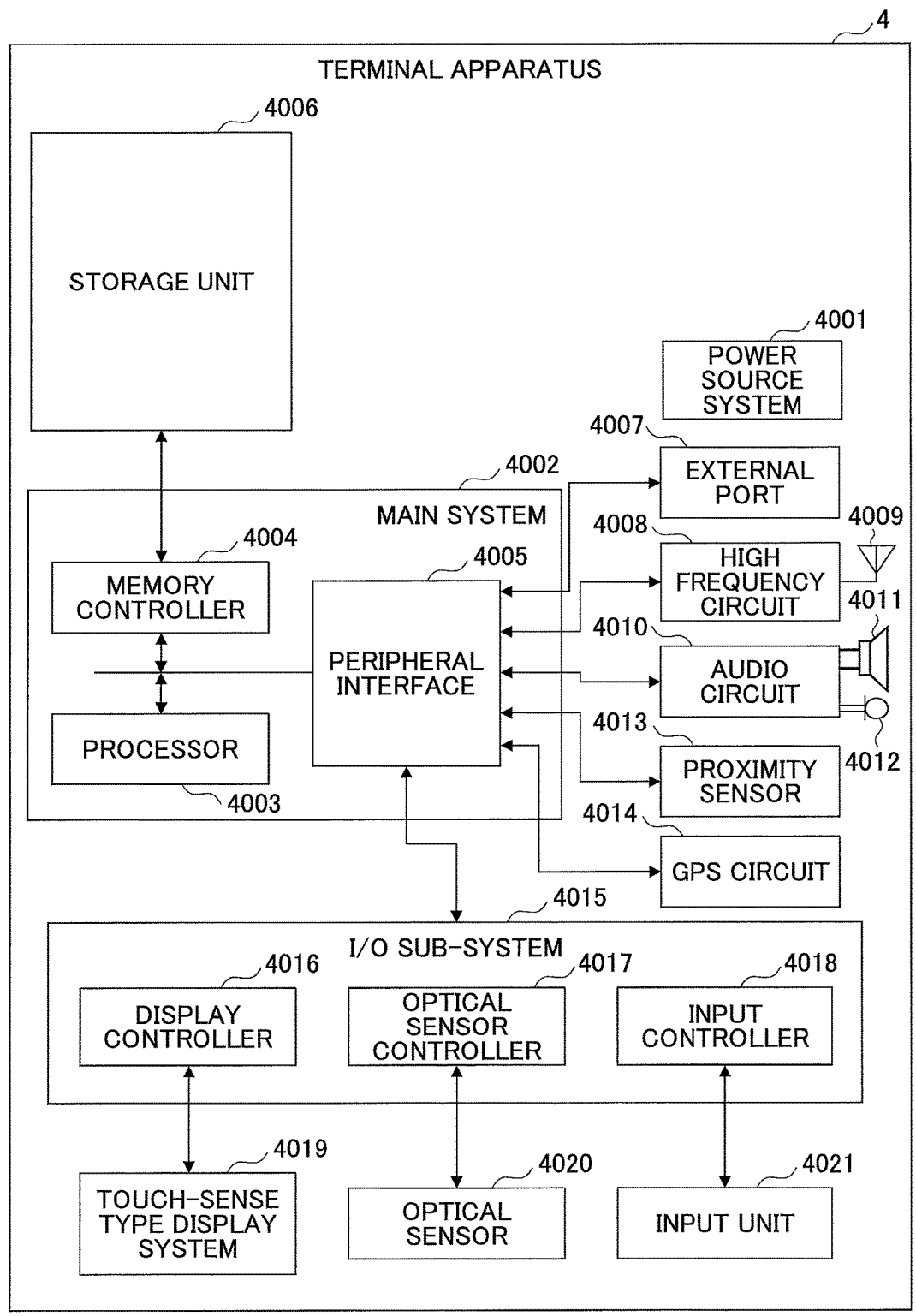
FIG. 8 is a schematic diagram illustrating a hardware configuration of a terminal device according to an embodiment of the present invention.

FIG. 8 is a schematic diagram illustrating a hardware configuration of the terminal device 4 according to an embodiment of the present invention. In FIG. 8, the terminal device 4 includes a main system 4002 and a storage unit 4006. The main system 4002 includes an electric power source system 4001, a processor 4003, a memory controller 4004, and a peripheral interface 4005. Further, the terminal device 4 also includes an external port 4007, a high frequency circuit 4008, an antenna 4009, an audio circuit 4010, a speaker 4011, a microphone 4012, a proximity sensor 4013, and a GPS (Global Positioning System) circuit 4014. Further, the terminal device 4 also includes an I/O (Input/Output) sub-system 4015, a touch-sense type display system 4019, an optical sensor 4020, and an input unit 4021. The I/O sub-system 4015 includes a display controller 4016, an optical sensor controller 4017, and an input controller 4018.

The functions of the terminal device 4 described above with reference to FIGS. 2 and 3 are implemented by a predetermined program executed by the processor 4003. The predetermined program may be an application obtained from the server apparatus 1.

<Operation>

Figure 9:
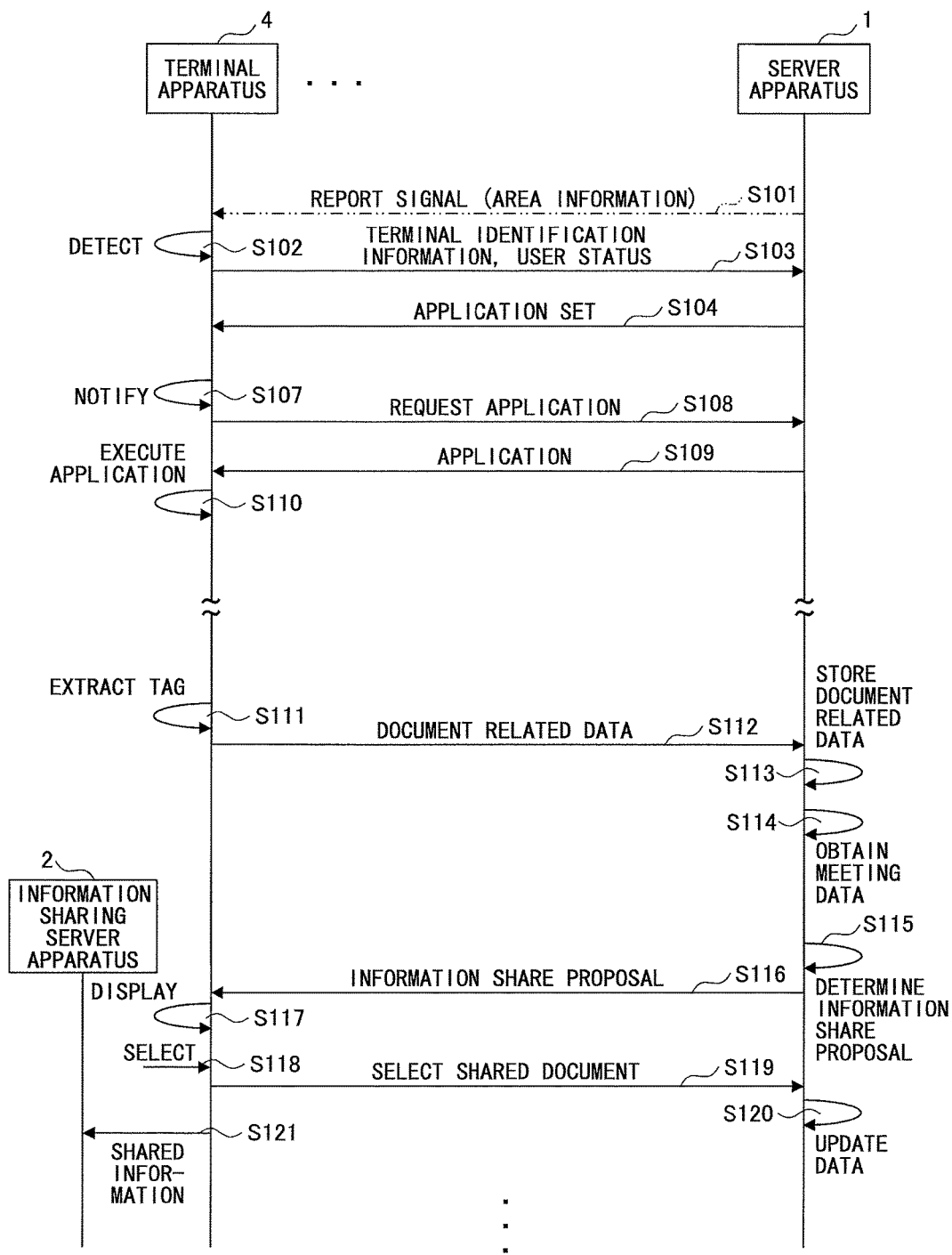
FIG. 9 is a sequence diagram illustrating an example of processes according to an embodiment of the present invention.

FIG. 9 is a sequence diagram illustrating an example of processes according to the above-described embodiments. In FIG. 9, the server apparatus 1 is transmitting a report signal including area information to a predetermined area by way of a wireless LAN or the like (Step S101). When the terminal device 4 enters the predetermined area, the sensing part 411 of the terminal device 4 detects the report signal (Step S102), and the user status transmission part 413 of the terminal device 4 transmits a signal including terminal identification info and user status information to the server 1 (Step S103). The user status information indicates the user status determined by the user status determination part 412. When the user status reception unit 111 of the server apparatus 1 receives the user status information, the application set management unit 112 of the server apparatus 1 selects an application set corresponding to the user status from the application set table 113, and the application set transmission unit 114 of the server apparatus 1 transmits the selected application set to the terminal device 4 (Step S104).

When the application set reception part 414 receives the application set from the server apparatus 1, the application set reception part 414 reports the received application set to the application obtaining part 415 (Step S107), and the application obtaining part 415 transmits an application request to the server apparatus 1 based on the reported application set (Step S108). In response to the application request, the server apparatus 1 transmits an application (application body) to the terminal device 4 (Step S109). The application execution part 417 of the terminal device 4 processes the application received from the server apparatus 1 into an executable state and executes the application (Step S110). The terminal devices 4 of other users that have gathered and entered the predetermined area for participating the meeting also perform processes in a similar manner as the processes performed by the terminal device 4.

Then, the terminal device 4 operates the meeting support unit 43 by executing the application. The tag extraction part 432 of the meeting support unit 43 extracts a tag of each document from the information retained in the share information retaining part 430 and managed by the information management part 431. The tag may be accompanying information (e.g., title or date) of a document or a keyword included in the main text of a document. Then, the tag extraction part 432 generates an information tag together with importance information in accordance with the location in which the tag appears in the document (appearance location) or the frequency in which the tag appears in the document (appearance frequency (Step S111). The information tag management part 433 manages the information tag generation process of the tag extraction part 432 and the information tag generated by the tag extraction part 432. Then, the document-related data transmission part 434 transmits document-related data to the server apparatus 1 (Step S112). The document-related data includes the information tag corresponding to each document managed by the information tag management part 433 and basic information corresponding to each document managed by the information management part 431.

The document-related data management part 132 of the meeting support unit 13 of the server apparatus 1 stores the document-related data received from the terminal device 4 in the document-related data retaining part 133 and manages the stored document-related data (Step S113).

Further, the meeting-related data management part 134 stores meeting-related data (i.e., data pertaining to a meeting held by users using multiple terminal devices 4) in the meeting-related data retaining part 135 and manages the stored meeting-related data (Step S114).

Then, when the meeting starts, the information share proposing part 136 determines the information recommended to be shared in the current status of the meeting based on the meeting-related data and the document-related data (Step S115). When the information is determined, the information share proposing part 136 transmits an information share proposal to the user's terminal device 4 retaining the determined information (Step S116). The processes performed by the information share proposing part 136 is described in further detail below.

When the information share proposal reception part 435 of the terminal device 4 receives the information share proposal, the information display/selection accepting part 436 of the terminal device 4 displays the content of the proposal to the user (Step S117). It is to be noted that, in a case where there is information already proposed in a previous information share proposal but not shared by the terminal devices 4, multiple proposals pertaining to multiple documents are displayed. When the user selects information to be shared from the displayed information share proposal (Step S118), the share information transmission/reception part 437 transmits the content of the selected share information (shared document) to the server apparatus 1 (Step S119). When the server apparatus 1 receives the content of the selected share information from the terminal device 4, the information share proposing part 136 of the server apparatus 1 updates the meeting-related data (Step S120). Further, the share information transmission/reception part 437 of the terminal device 4 transmits data of the document to be shared to the shared information server apparatus 2 (Step S121). Thereby, information is shared between the members participating in the meeting under the management of the shared information server apparatus 2.

Figure 10:
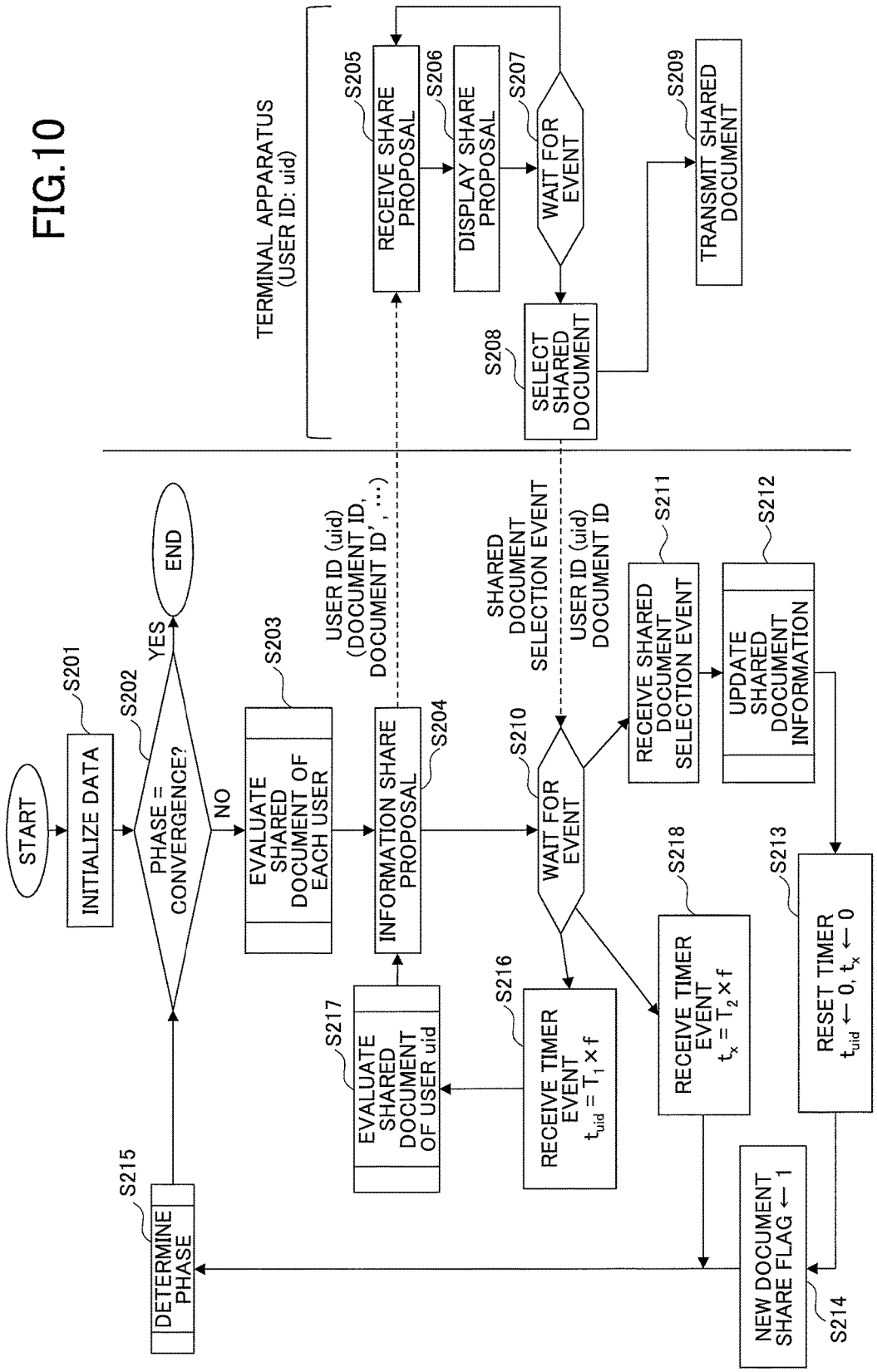
FIG. 10 is a flowchart illustrating an operation of proposing information to be shared according to an embodiment of the present invention.

FIG. 10 is a flowchart illustrating an operation performed when proposing information to be shared according to an embodiment of the present invention. In FIG. 10, the information share proposing part 136 performs data initialization when the information share proposing part 136 starts to operate (Step S201). More specifically, the information share proposing part 136 sets an initial value of a shared information tag vector $stv_o$, sets "simple sharing" to be the meeting phase, and sets "0" to be a new document share flag.

Then, the information share proposing part 136 determines whether the current phase of the meeting is a "convergence" status (Step S202). In a case where the information share proposing part 136 determines that the status of the meeting phase is "convergence" (Yes in Step S202), the operation is terminated. Thus, in order for the meeting to settle, the sharing of information is not to be newly proposed when the meeting is in a "convergence" phase.

In a case where the information share proposing part 136 determines that the phase of the meeting is not "convergence" (No in Step S202), the document share evaluation part 136a performs a document share evaluation process with respect to each user of all members participating in the meeting (Step S203).

FIG. 11 is a flowchart illustrating an operation of the document share evaluation process according to an embodiment of the present invention. In FIG. 11, the document share evaluation part 136a obtains meeting phase data and user ID (uid) data (Step S221). Then, the document share evaluation part 136a obtains a set of information tag vectors $itv_{uid}$ corresponding to the documents whose share-completion flag in the basic document data is 0 (i.e., the documents not yet shared) according to the obtained user ID data (Step S222).

Then, the document share evaluation part 136a checks the phase of the meeting (Step S223). In a case where the meeting is a "simple sharing" phase, the document share evaluation part 136a performs matching on the current shared information tag vector$_{stvn}$ with respect to the set of information tag vectors $itv_{uid}$ by using an evaluation expression "Match" (Step S224). In a case where the meeting phase is "divergence", the document share evaluation part 136a performs matching on the shared information tag vector$_{stvn}$ with respect to the set of information tag vectors $itv_{uid}$ by using an evaluation expression "Match_d" (Step S225). Then, the document share evaluation part 136a selects information (document) having a high matching degree to be the proposed share information (Step S226).

FIG. 12 is a schematic diagram illustrating a matching evaluation expression according to an embodiment of the present invention. The evaluation expression "Match" is the sum total of the products of the weight of the common tag(s) commonly included in both the shared information tag vector$_{stv}$ and the information tag vector$_{itv}$ and the importance of the common tag. Further, the evaluation expression "Match_d" is the sum total obtained by adding the value of the expression "Match" with the sum total of the importance of the tags that are not included in the shared information tag vector$_{stv}$ and included only in the information tag vector$_{itv}$. In other words, the expression "Match" is used to evaluate a document having commonness with the tags included in the current shared information tag vector$_{stv}$ whereas the expression "Match_d" is used to evaluate not only a document having commonness with the tags included in the current shared information tag vector$_{stv}$ but also a document having tags that are different from the tags included in the current shared information tag vector$_{stv}$.

After performing the document share evaluation process in Step S203 of FIG. 10, the information share proposing part 136 transmits an information share proposal to a user's terminal device 4 that is retaining the information to be proposed for sharing (Step S204). Then, the information share proposing part 136 waits for receiving an event from the terminal device 4 (Step S210).

When the terminal device 4 receives the information share proposal (Step S205), the terminal device 4 displays the information share proposal to the user (Step S206). Then, the terminal device 4 waits for receiving an operation event from the user (Step S207). In a case where the user selects a document to be shared (Step S208), the terminal device 4 transmits a shared document selection event to the server apparatus 1. In addition, the terminal device 4 transmits the document to be shared to the information sharing server apparatus 2 (Step S209). In a case where the user does not select a document to be shared, the terminal device 4 waits for receiving the next information share proposal. When the terminal device 4 receives the next (new) information share proposal (Step S205), the terminal device 4 displays the new information share proposal to the user (Step S206). In this case, the new information share proposal is displayed in continuation with the content of the previously received information share proposal.

When the information share proposing part 136 receives a shared document selection event (Step S211), a shared document information updating part 136b updates the shared document information (Step S212).

Figure 13:
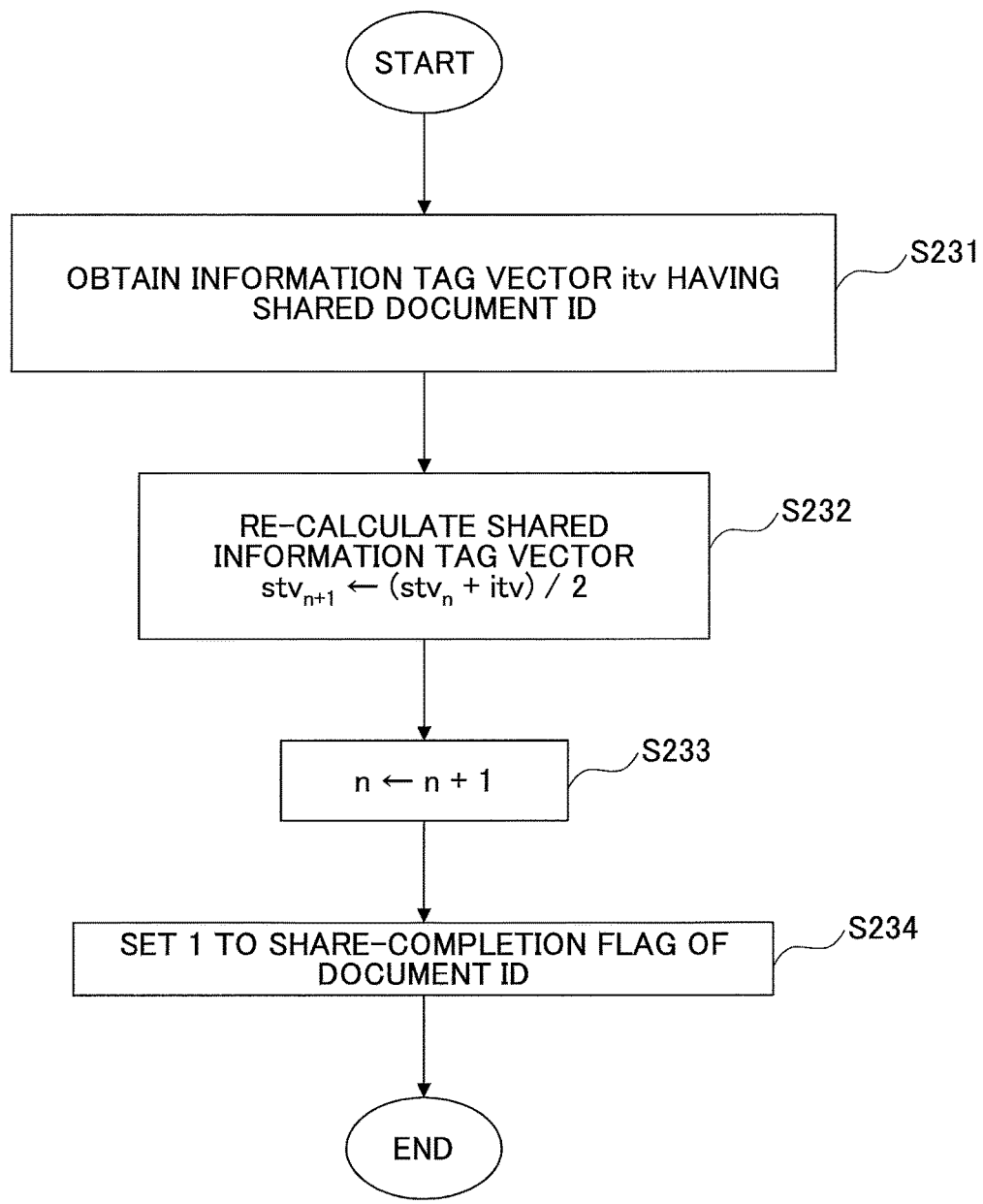
FIG. 13 is a flowchart illustrating an operation of updating shared document information according to an embodiment of the present invention.

FIG. 13 is a flowchart illustrating an operation of a shared document information updating process according to an embodiment of the present invention. In FIG. 13, the shared document information updating part 136b obtains the information tag vector$_{itv}$ having the ID of the shared document (Step S231) and re-calculates the shared information tag vector (Step S232). More specifically, the shared document information updating part 136b sets a new shared information tag vector $stv_{n+1}$ by calculating the vector average of the current shared information tag vector $stv_n$ and the information tag vector$_{itv}$. Then, the shared document updating part 136b increments the index$_n$ (Step S233) and sets the share-completion flag of a corresponding document ID to "1" (Step S234).

After performing the shared document information updating process in Step S212 of FIG. 10, the information share proposing part 136 resets a timer $t_{uid}$ of each user and an overall timer (all-user timer) $t_x$ (Step S213). Once the timers $t_{uid}$, $t_x$ are reset, the timers$_{uid}$, $t_x$ start counting up. A timer 136c controls the timer $t_{uid}$ of each user, so that an event occurs when the timer $t_{uid}$ of each user reaches "$T_1 \times f$" ($T_1$: Minimum waiting time in user units, f: integer). Further, the timer 136c controls the overall timer $t_x$, so that an event occurs when the overall timer $t_x$ reaches "$T_2 \times f$" ($T_2$: Minimum overall waiting time, f: integer).

Then, the information share proposing part 136 sets the new document share flag to "1" (Step S214). Then, a phase deciding part 134c of the information share proposing part 136 decides the phase of the meeting (Step S215). Then, the information share proposing part 136 returns to the meeting phase determining process (Step S202).

Figure 14:
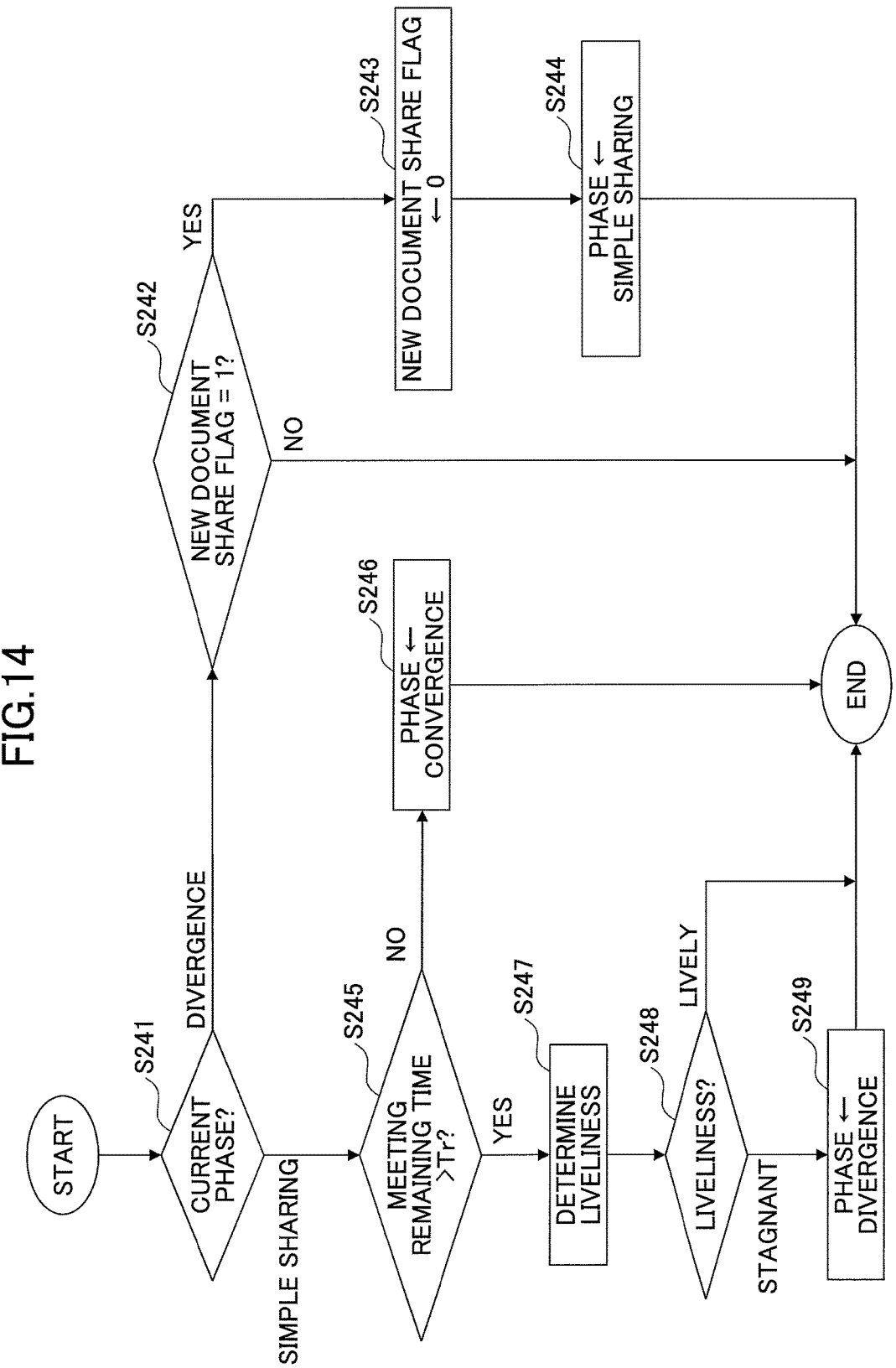
FIG. 14 is a flowchart illustrating an operation of deciding a meeting phase according to an embodiment of the present invention.

FIG. 14 is a flowchart illustrating a meeting phase deciding operation according to an embodiment of the present invention. The phase deciding part 134c determines the current phase of the meeting (Step S241). Note that the information share proposing part 136 does not proceed to the process of deciding the phase of the meeting in a case where the phase of the meeting is a "convergence" phase. Therefore, the phase of the meeting in Step S241 is either the "simple sharing" phase or the "divergence" phase.

In a case where the meeting phase is a "divergence" phase, the phase deciding part 134c determines whether the new document share flag is "1" (Step S242). In a case where the new document share flag is "1" (Yes in Step S242), the phase deciding part 134c sets the new document share flag to "0" (Step S243) and changes the meeting phase to a "simple sharing" phase (Step S244). In a case where the new document share flag is "0" (No in Step S242), the phase deciding part 134c terminates the meeting phase deciding operation.

In a case where the meeting phase is a "simple sharing" phase, the phase deciding part 134c determines whether the remaining meeting time (excluding a case where the meeting time is "null") is longer than a predetermined time Tr (Step S245). In a case where an end time is set beforehand, the remaining meeting time is the difference between the end time and the current time (case 1). In a case where the schedule of the participant of the meeting is known beforehand, an expected end time may be dynamically decided, so that the remaining meeting time is the difference between the expected end time and the current time (case 2). Other than the aforementioned cases 1 and 2, the remaining meeting time is "null".

In a case where the remaining meeting time is shorter than or equal to the predetermined time Tr (No in Step S245), the phase deciding part 134c changes the phase of the meeting to "convergence" (Step S246) and terminates the meeting phase deciding operation.

In a case where the remaining meeting time is longer than the predetermined time Tr (Yes in Step S245), a liveliness determining part of the phase deciding part 134c determines the liveliness of the meeting (meeting liveliness) (Step S247). Then, the phase deciding part 134c determines the level of the meeting liveliness. That is, the phase deciding part 134c determines whether the meeting liveliness is "lively" or a "stagnant" (Step S248). In a case where the meeting liveliness is "lively", the phase deciding part 134c terminates the meeting phase deciding operation. In a case where the meeting liveliness is "stagnant", the phase deciding part 134c changes the phase of the meeting to "convergence" (Step S249) and terminates the meeting phase deciding operation.

Returning to FIG. 10, when the information share proposing part 136 receives an event indicating that the time $t_{uid}$ of a user$_{uid}$ has reached a predetermined value ($T_1 \times f$) (Step S216) in a case where the information share proposing part 136 is in an event waiting state (Step S210), the information share proposing part 136 performs a document share evaluation process with respect to the terminal device 4 of the user$_{uid}$ (Step S217) and proceeds to the information share proposing process (Step S204). Because a new information sharing process has not been performed for a predetermined time or more after the latest information sharing of another user$_{uid}$, an information share proposing process is to be newly performed for the user$_{uid}$.

When the information share proposing part 136 receives an event indicating that the overall timer tx has reached a predetermined value ($t_2 \times f$) (Step S218) in a case where the information share proposing part 136 is in an event waiting state (Step S210), the information share proposing part 136 proceeds to the meeting phase deciding process (Step S215). Because a new information sharing process has not been performed for any of the users for a predetermined time or more after the latest information sharing of one of the users, an information share proposing process is to be newly performed for all of the users.

Figure 15:
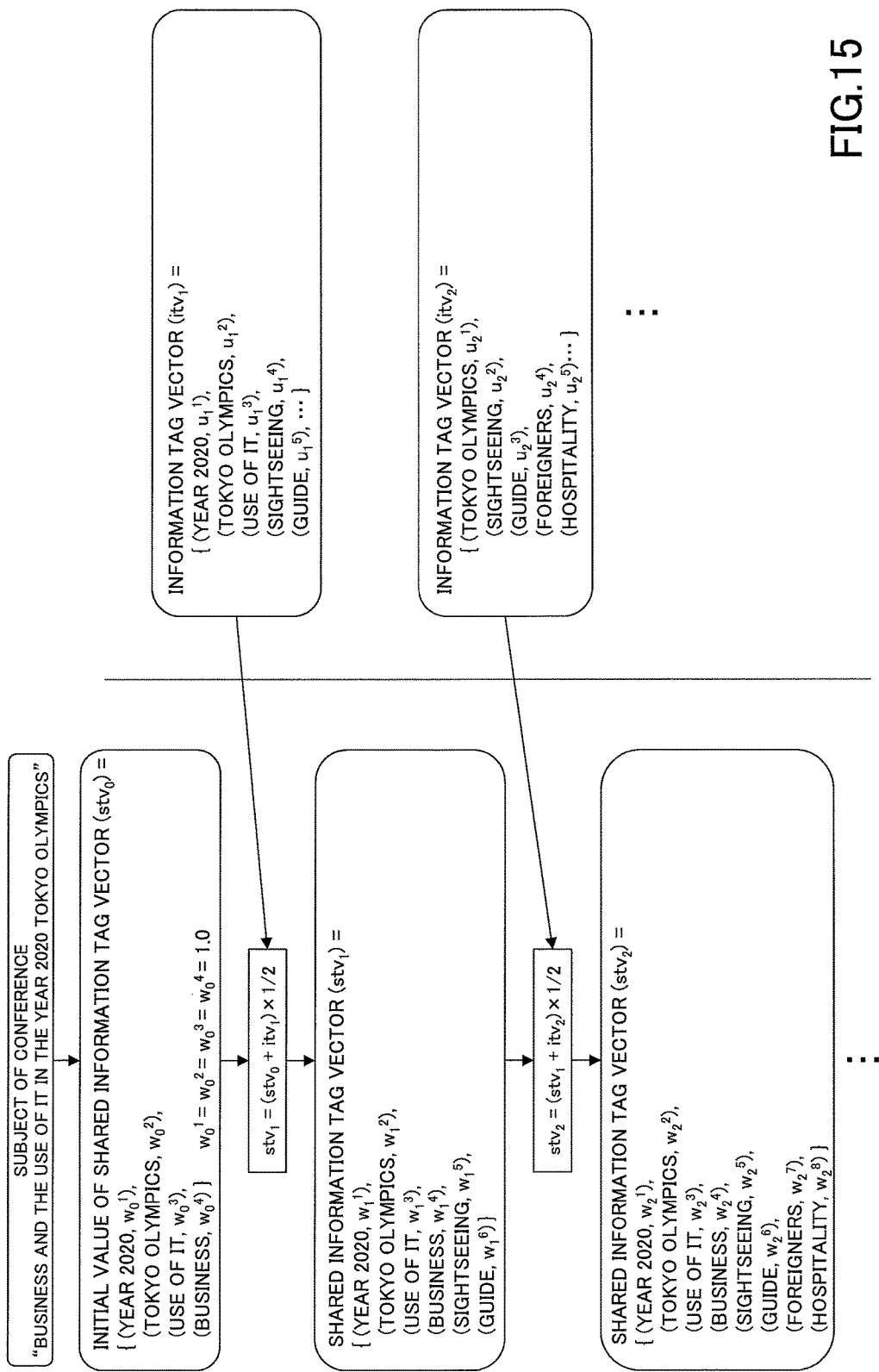
FIG. 15 is a schematic diagram illustrating a detailed example of an operation of sharing information according to an embodiment of the present invention.

FIG. 15 is a schematic diagram illustrating a detailed example of the information sharing process. In a case where the subject of a meeting is "Business and the use of IT in the year 2020 Tokyo Olympics" as illustrated in FIG. 15, the tags that are included in the subject of the meeting such as "year 2020", "Tokyo Olympics", "use of IT", and "business" are extracted to be the initial values (stv$_0$) of the information share tag vectors. Each of the extracted tags are set with an initial tag weight of "1.0".

Then, when a document of an information tag vector (itv$_1$) including the tags "year 2020", "Tokyo Olympics", "use of IT", "sightseeing", and "guide" is proposed to be shared and becomes shared by the users, a new information share tag vector (stv$_1$) is obtained according to the vector average of the initial values of the information share tag vector (stv$_0$) and the information tag vector (itv$_1$). Thereby, the new information share tag vector (stv$_1$) includes the tags "year 2020", "Tokyo Olympics", "use of IT", "business", "sightseeing", and "guide".

Similarly, when a document of an information tag vector (itv$_2$) including the tags "Tokyo Olympics", "Sightseeing", "guide", "foreigners", and "hospitality" is proposed to be shared and becomes shared by the users, a new information share tag vector (stv$_2$) is obtained according to the vector average of the values of the information share tag vector (stv$_1$) and the information tag vectors (itv$_2$). Thereby, the new information share tag vector (stv$_2$) includes the tags "year 2020", "Tokyo Olympics", "use of IT", "business", "sightseeing", "guide", "foreigners", and "hospitality".

Modified Example

In the configuration illustrated in FIG. 3, the proposing of information sharing is performed by the meeting support unit 13 on the side of the server apparatus 1. Alternatively, the proposing of information sharing among the user's terminal devices may be performed on the side of each of the terminal devices 4. Thereby, the work load of the server apparatus 1 can be reduced.

In this case, a "meeting data transmission part" is to be newly provided in the meeting support unit 13 of the server apparatus 1, so that meeting-related data related to the members participating in a meeting can be transmitted to the terminal device 4 of each of the members. Further, a "meeting data reception part" is to be provided in the terminal device 4, so that the terminal device 4 can receive the meeting-related data. Further, an "information share proposing part" serving as the information share proposing part 136 is to be provided on the side of the terminal device 4. In this case, the document share evaluation process of each user in Step S203 of FIG. 10 and the document share evaluation process of a user ID (uid) in Step S217 of FIG. 10 are limited to the evaluation of the user's terminal. In this case, substantially the same processes are performed as those of the above-described embodiments except for the processes performed in Steps S203 (evaluation of shared documents of each user) and S217 (evaluation of shared documents of a user uid).

Hence, with the above-described embodiments, the sharing of information can be supported according to the status of a meeting.

It is to be noted that "information tag vector itv" is an example of first tag information and "information share tag vector sty" is an example of second tag information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for executing a meeting support process, the method comprising:
   reporting area information identifying a predetermined area to the predetermined area;
   transmitting an application program when terminal identification information identifying a terminal device is received from the terminal device that received the area information;
   receiving first tag information transmitted in response to an operation performed by the application program, the first tag information containing a first tag and importance information of the first tag, the first tag being included in information that the terminal device allows to be shared;
   retaining the received first tag information;
   managing second tag information shared in a meeting that is held by the terminal device and another terminal device, the second tag information containing a second tag and importance information of the second tag, the second tag being included in information that is already shared by the terminal device and the other terminal device;
   determining a target share information to be newly shared according to the first tag information and the second tag information;
   transmitting a proposal proposing that the target share information be shared to the terminal device retaining the target share information; and
   updating the second tag information based on tag information including a tag and importance information of the target share information that is newly shared in a case of receiving a response from the application program indicating that the terminal device accepts the proposal.

2. The method as claimed in claim 1, further comprising:
   determining a phase of the meeting; and
   changing a match evaluation expression used in the determining of the target share information in accordance with the phase.

3. The method as claimed in claim 2,
   wherein the phase includes a simple sharing phase for sharing information between participants of the meeting, a divergence phase for presenting opinions of the participants and creating ideas, and a convergence phase for concluding the ideas,
   wherein in a case where the phase is the simple sharing phase, the match evaluation expression is based on an importance of a tag and a weight of a tag that are commonly included in the first tag information and the second tag information, and
   wherein in a case where the phase is the divergence phase, the match evaluation expression is based on the importance of the tag and the weight of the tag that are commonly included in the first tag information and the second tag information along with a weight of a tag that is not included in the second tag information and included in the first tag information.

4. The method as claimed in claim 2,
   wherein the determining of the phase is based on whether information is shared immediately before the phase, a remaining time of the meeting, and a liveliness of the meeting.

5. The method as claimed in claim 1, wherein the transmitting of the other proposal is started after the second tag information is updated in a case where the other proposal is accepted.

6. The method as claimed in claim 1,
   wherein the transmitting of another proposal for sharing another target share information is started when a time elapsed from the transmitting of the proposal reaches a first threshold, and
   wherein the transmitting the another proposal is transmitted to the terminal device and the other terminal device when the time elapsed from the transmitting of the proposal reaches a second threshold.

7. A meeting support apparatus comprising:
   a processor that executes a process including
      reporting area information identifying a predetermined area to the predetermined area,
      transmitting an application program when terminal identification information identifying a terminal device is received from the terminal device that received the area information,
      receiving first tag information transmitted in response to an operation performed by the application program, the first tag information containing a first tag and importance information of the first tag, the first tag being included in information that the terminal device allows to be shared,
      retaining the received first tag information,
      managing second tag information shared in a meeting that is held by the terminal device and another terminal device, the second tag information containing a second tag and importance information of the second tag, the second tag being included in information that is already shared by the terminal device and the other terminal device,
      determining a target share information to be newly shared according to the first tag information and the second tag information,
      transmitting a proposal proposing that the target share information be shared to the terminal device retaining the target share information, and
      updating the second tag information based on tag information including a tag and importance information of the target share information that is newly shared in a case of receiving a response from the application program indicating that the terminal device accepts the proposal.

8. The meeting support apparatus as claimed in claim 7, wherein the process further includes determining a phase of the meeting, and changing a match evaluation expression used in the determining of the target share information in accordance with the phase.

9. The meeting support apparatus as claimed in claim 8,
wherein the phase includes a simple sharing phase for sharing information between participants of the meeting, a divergence phase for presenting opinions of the participants and creating ideas, and a convergence phase for concluding the ideas,
wherein in a case where the phase is the simple sharing phase, the match evaluation expression is based on an importance of a tag and a weight of a tag that are commonly included in the first tag information and the second tag information, and
wherein in a case where the phase is the divergence phase, the match evaluation expression is based on the importance of the tag and the weight of the tag that are commonly included in the first tag information and the second tag information along with a weight of a tag that is not included in the second tag information and included in the first tag information.

10. The meeting support apparatus as claimed in claim 8, wherein the determining of the phase is based on whether information is shared immediately before the phase, a remaining time of the meeting, and a liveliness of the meeting.

11. The meeting support apparatus as claimed in claim 7, wherein the transmitting of the other proposal is started after the second tag information is updated in a case where the other proposal is accepted.

12. The meeting support apparatus as claimed in claim 7,
wherein the transmitting of another proposal for sharing another target share information is started when a time elapsed from the transmitting of the proposal reaches a first threshold, and
wherein the transmitting the another proposal is transmitted to the terminal device and the other terminal device when the time elapsed from the transmitting of the proposal reaches a second threshold.

13. A non-transitory computer-readable recording medium storing a program that causes a computer to execute a process, the process comprising:
reporting area information identifying a predetermined area to the predetermined area;
transmitting an application program when terminal identification information identifying a terminal device is received from the terminal device that received the area information;
receiving first tag information transmitted in response to an operation performed by the application program, the first tag information containing a first tag and importance information of the first tag, the first tag being included in information that the terminal device allows to be shared;
retaining the received first tag information;
managing second tag information shared in a meeting that is held by the terminal device and another terminal device, the second tag information containing a second tag and importance information of the second tag, the second tag being included in information that is already shared by the terminal device and the other terminal device;
determining a target share information to be newly shared according to the first tag information and the second tag information;
transmitting a proposal proposing that the target share information be shared to the terminal device retaining the target share information; and
updating the second tag information based on tag information including a tag and importance information of the target share information that is newly shared in a case of receiving a response from the application program indicating that the terminal device accepts the proposal.

14. The non-transitory computer-readable recording medium as claimed in claim 13, wherein the process further includes determining a phase of the meeting, and changing a match evaluation expression used in the determining of the target share information in accordance with the phase.

15. The non-transitory computer-readable recording medium as claimed in claim 14,
wherein the phase includes a simple sharing phase for sharing information between participants of the meeting, a divergence phase for presenting opinions of the participants and creating ideas, and a convergence phase for concluding the ideas,
wherein in a case where the phase is the simple sharing phase, the match evaluation expression is based on an importance of a tag and a weight of a tag that are commonly included in the first tag information and the second tag information, and
wherein in a case where the phase is the divergence phase, the match evaluation expression is based on the importance of the tag and the weight of the tag that are commonly included in the first tag information and the second tag information along with a weight of a tag that is not included in the second tag information and included in the first tag information.

16. The non-transitory recording medium as claimed in claim 14,
wherein the determining of the phase is based on whether information is shared immediately before the phase, a remaining time of the meeting, and a liveliness of the meeting.

17. The non-transitory recording medium as claimed in claim 13, wherein the transmitting of the other proposal is started after the second tag information is updated in a case where the other proposal is accepted.

18. The non-transitory recording medium as claimed in claim 13,
wherein the transmitting of another proposal for sharing another target share information is started when a time elapsed from the transmitting of the proposal reaches a first threshold, and
wherein the transmitting the another proposal is transmitted to the terminal device and the other terminal device when the time elapsed from the transmitting of the proposal reaches a second threshold.

* * * * *